United States Patent [19]
Schroter

[11] 3,719,106
[45] March 6, 1973

[54] VARIABLE RATIO OPERATING LEVER

[76] Inventor: Hans O. Schroter, Robert-Koch-Strasse 18, Munich, Germany

[22] Filed: May 3, 1971

[21] Appl. No.: 139,667

[30] Foreign Application Priority Data

May 2, 1970  Germany................P 20 21 504.7

[52] U.S. Cl.................................................74/518
[51] Int. Cl................................................G05g 1/04
[58] Field of Search..............................74/518, 516

[56] References Cited

UNITED STATES PATENTS

| 914,277 | 3/1909 | Howe | 74/518 X |
| 1,576,958 | 3/1926 | Fick | 74/518 |

FOREIGN PATENTS OR APPLICATIONS

| 635,956 | 4/1950 | Great Britain | 74/518 |

*Primary Examiner*—Milton Kaufman
*Attorney*—Edmund M. Jaskiewicz

[57] ABSTRACT

A variable ratio operating lever is pivotally mounted so as to be moveable between release and braking positions and has a control lever pivotally mounted thereon. An actuating element is connected to the control lever and extends to the linkage or other apparatus which is to be operated. One end of the control lever abuts a stationary stop when the operating lever is in its release position and the control lever is pivoted by the stop when the operating lever is moved from its release position so that the distance between the longitudinal axis of the actuating means and the operating lever pivot is rapidly decreased to a minimum.

7 Claims, 6 Drawing Figures

INVENTOR
HANS O. SCHRÖTER

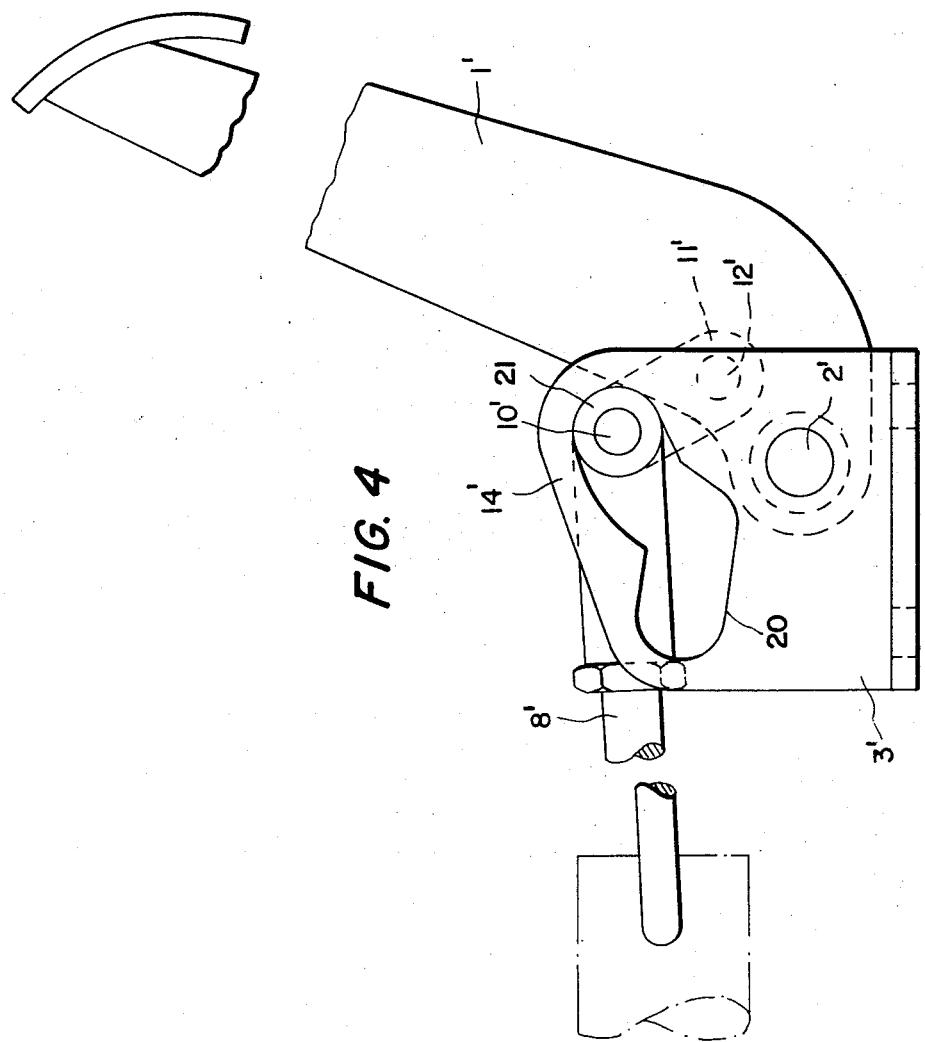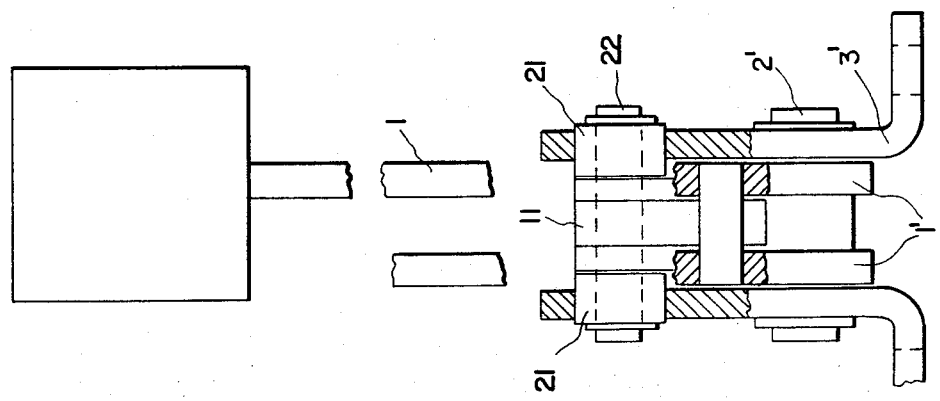

VARIABLE RATIO OPERATING LEVER

The present invention relates to a variable ratio operating lever such as for a brake linkage system, more particularly, to an operating lever having a structure which quickly varies the ratio of force transmitted to the distance through which the operating lever is pivoted from its release position.

Variable ratio operating levers, particularly for brake linkage systems have been provided which decrease the distance between an actuating or force transmitting member connected to the operating lever and a pivot mount of the operating lever as the operating lever is moved from its release position to a braking position. This distance is decreased to a minimum value which then remains substantially constant during the subsequent portion of the povotal movement of the operating lever to its braking position. Such operating levers are advantageous in that they provide for a more effective utilization of the actuating force derived from the povotal movement of the operating lever as a result of the increase of the force transmission ratio between the release and braking positions of the operating lever. Further, such operating levers also quickly overcome any slack or play in the brake linkage system through povoting movement of the operating lever through a very short distance from its release position. The known operating levers of this type are not satisfactory since they must be pivoted through a relatively large angle from their release positions.

In order to overcome this disadvantage variable ratio operating levers were constructed wherein the linkage or actuating member leading to the braking system is connected to an additional lever mounted on the operating lever and pivoted with respect to the operating lever by a stationary curved cam path upon pivotal movement of the operating lever. The variation in the ratio between the transmission force and pivotal movement of the operating lever is determined by the shape of the cam path. However, this proposed structure was not satisfactory since considerable friction forces wher generated during the movement of the additional lever on the cam path. These friction forces reduced the overall efficiency of the operating lever. The decrease in efficiency of the operating lever is due to the fact that the very high forces on the linkage system which occur at the moment of the maximum ratio are transmitted to the curved guide path.

It is therefore the principal object of the present invention to provide a novel and improved variable ratio operating lever which is particularly adapted for brake linkage systems.

It is another object of the present invention to provide a variable ratio operating lever wherein any slack or play in the brake linkage is quickly overcome within a substantially smaller pivoting distance of the lever and which provides a high mechanical efficiency after the brake shoes have been applied.

The present invention essentially discloses a variable ratio operating lever particularly adapted for a brake linkage system wherein the operating liver is pivotally mounted for movement between release and braking positions. A control lever is pivotally mounted on the operating lever and an actuating element which leads to the brake linkage is connected to the control lever. Means are provided which are responsive to the initial movement of the operating lever from its release position for accelerating the movement of the longitudinal axis of the actuating element toward the pivot mount of the operating lever. The longitudinal axis of the actuating element is moved to a position where it at least intersects the pivot mount of the control lever and the control lever remains in a position during the subsequent movement of the operating lever from its release position wherein the distance between the longitudinal axis and the operating lever pivot is a minimum. This position of the control lever may be such that the longitudinal axis of the actuating element intersects the control lever pivot.

The means for accelerating the movement of the longitudinal axis of the actuating element toward the operating lever pivot may comprise a stationary stop which is abutted by the control lever when the operating lever is in the release position. Said means may also comprise a notch which slideably receives one end of the control lever to guide bilaterally the pivotal movement of the control lever when the operating lever is near its release position.

In a further modification the control lever may be pivoted at one end on the operating lever and the actuating element connected to its other end. A guide roller mounted on the control lever adjacent its connection with the actuating element is guided by a cam groove to accelerate rapidly the the movement of the longitudinal axis of the actuating element toward the operating lever pivot upon initial movement of the operating lever from its release position.

Other subjects and advantages of the present invention will be apparent upon reference to the accompanying description when taken in conjunction with the following drawings, which are exemplary, wherein:

FIG. 4 is a side elevational view of an operating lever according to the present invention employed as a foot lever and having a rigid rod for transmitting an actuating force to a brake linkage; and FIG. 4a is a front elevational view of the foot lever of FIG. 4 with a portion thereof being shown in section.

Proceeding next to the drawings wherein like reference symbols indicate the same part throughout the various views a specific embodiment and modifications of the present invention will be described in detail.

Figure 1:
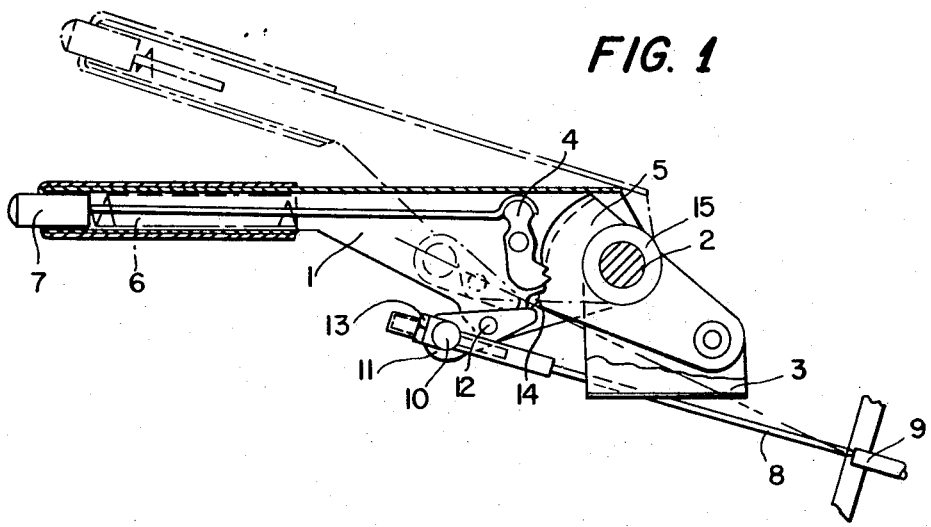
FIG. 1 is a side elevational view of a manually manipulated operating lever according to the present invention and partially in section with the release position of the lever being indicated by the solid lines and an intermediate position being indicated by dash lines with the intermediate position being approximately the travel of the actuating element to overcome any play in the brake linkage.
Figure 2:
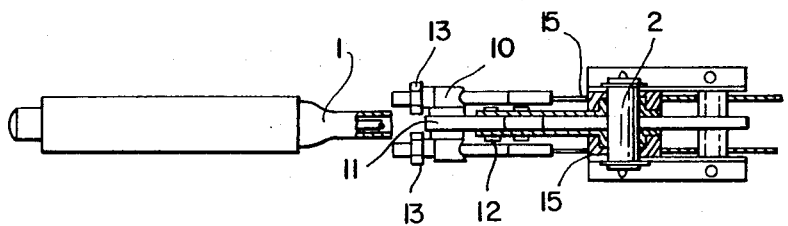
FIG. 2 is a top plan view of the operating lever of FIG. 1.

As illustrated in FIGS. 1 and 2 an operating lever 1 is pivotally mounted about a pin 2 supported in a stationary bracket 3. The lever 1 is employed as a hand brake lever for applying brakes in a vehicle and can be locked in position with respect to the bracket 3 by means of a spring loaded catch 4 engageable with a toothed segment 5 fixedly attached to the bracket 3. The catch 4 can be released from the toothed segment 5 by means of a plunger pin 7 against the force exerted by a compression spring 6 mounted in the handle of the operating lever. The plunger pin 7 has a rod-like element which is connected to the catch lever 4 to pivot the catch lever into a release position.

The operating lever 1 is connected to the braking system by means of a force transmitting or actuating element which in the present embodiment comprises a cable 8. The cable 8 is guided in a fixed tubular guide element 9 and is connected at 10 to a control lever 11 pivotally mounted at 12 on the operating lever 1. In the present embodiment there are provided two cables 8 with each cable being linked to a wheel brake to actuate the brakes. The tension in the cables 8 can be adjusted by means of the adjusting nuts 13 on the control lever 11.

The lower end of the toothed segment 5 is provided with a stop 14 which abuts the free end of the control lever 11 when the operating lever is in the release position as shown by the solid lines in FIG. 1. In this release position, the cable 8 is located at its maximum distance from the pivot 2 of the operating lever. As a result, the ratio of the pivoting distance of the handle of the operating lever 1 to the travel of the cable 8 is relatively small. When the operating lever 1 is pivoted in the clockwise direction from its release position the distance between the cable 8 and the operating lever pivot 2 decreases and reaches a minimum when the cable 8 rests on guide rollers 15 mounted on the pivot pin 2. As the cable 8 approaches the pivot 2 the ratio of the pivoting distance of the operating lever 1 to the travel of the cable 8, i.e., the transmission ratio or lever advantage, will increase.

In the operation of the operating lever as disclosed above, pivoting of the operating lever 11 in the clockwise direction from its release position will cause the control lever 11 initially to be retained in the position illustrated because of its abutting relation with the stationary stop 14. As the operating lever 1 is pivoted further from its release position the control lever 11 will also pivot in the clockwise direction around its pivot 12. The pivoting of the control lever 11 will cause the longitudinal axis of the cable 8 to be accelerated toward the pivot 2 of the operating lever and the longitudinal axis will cross over the control lever pivot 12. As the cable 8 passes over the control lever pivot 12 the control lever 11 will be positioned on the operating lever 1 by means of the tension exerted by the cable 8. In this position of the control lever 11 the right end of the control lever will be disengaged from the stop 14 as may be seen in the intermediate position shown by dash lines in FIG. 1. Because of the accelerated approach of the cable 8 to the operating lever pivot 2, it is necessary that the operating lever move through a relatively short pivoting distance during its initial movement from its release position during which time the cable 8 will be moved through a distance sufficient for overcoming any slack or play in the linkage. Since no significant forces must be overcome during this initial movement of the cable 8, the initial pivoting movement of the operating lever 1 in the braking direction can be performed without encountering undesirable high actuating forces.

If the operating lever 1 is now pivoted in the counterclockwise direction or toward the release position, the control lever 11 will also be pivoted counterclockwise by the cable 8 as it crosses over the control lever pivot 12. The pivoting of control lever 11 will continue until its right end as viewed in FIG. 1 abuts the stop 14. Undesirable friction forces in the operating lever arrangement are thus prevented since after any slack or play in the linkage system has been overcome the control lever 11 is disengaged from the stop 14 and supported against the operating lever 1. Thus, at the time when significant forces are effective on the cable 8 the operating lever will possess its maximum mechanical efficiency.

Figure 3:
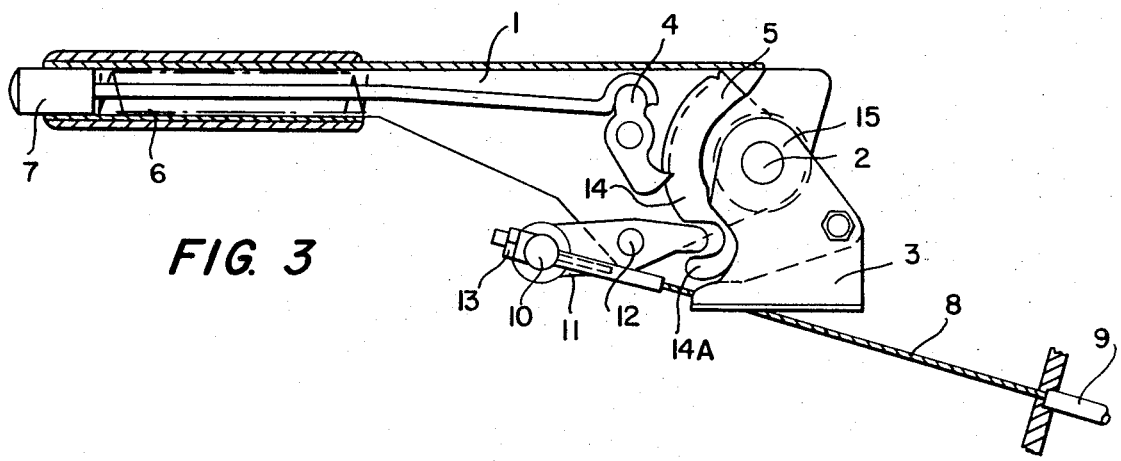
FIG. 3 is a view similar to that of FIG. 1 but illustrating a modified structure for guiding the control lever.
Figure 3A:
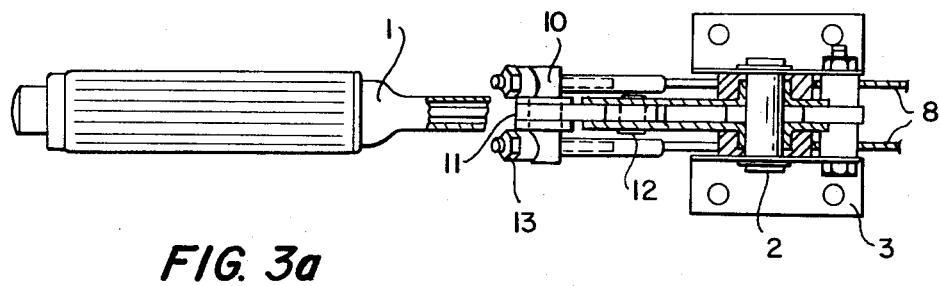
FIG. 3a is a top plane view of the modification shown in FIG. 3.

In FIGS. 3 and 3a the stationary stop for the control lever 11 is replaced by a notch or recess 14A which slideably receives the right end of the control lever 11 as shown in FIGS. 3 and 3a. This notch bilaterally guides the pivotal movement of the control lever 11 when the operating lever 1 is in the vicinity of its release position. The control lever 11 is thus guides in its pivotal movement by the notch 14A even if the brake linkage should be disconnected from the control lever. This modification is of particular advantage in that a simple structure of the operating lever is obtained which is relatively inexpensive to manufacture. Even the removal or disconnection of the linkage or the cable 11 will not affect the movement of the control lever 11 since this control lever will be positively guided by the notch 14A during pivoting of the operating lever 1.

In FIGS. 4 and 4a the operating lever 1' is constructed as a foot lever which is provided with a pedal upon which the operator's foot is pressed. The control lever 11' is pivoted at one end on a pivot pin 12' and is provided with guide rollers 21 at its pivot connection 10' connecting the control lever 11' to the actuating element 8'. The actuating element 8' may comprise a rigid rod or plunger which exerts a compression force on the brake linkage system.

The guide rollers 21 are moveable within cam grooves or slots 20 in the mounting bracket 3'. During the entire pivoting movement of the operating lever 1' the control lever 11' is guided by the cam slots 20 acting on the guide rollers 21.

The cam slot 20 is so shaped that during the initial movement of the operating lever 1' from its release position the guide rollers 21 are moved rapidly towards the operating lever pivot 2' so that the longitudinal axis of actuating element 8' is accelerated toward the pivot 2'. Subsequent movement of the operating lever 1' will cause the actuating element 8' to be maintained at approximately a constant distance from the pivot 2'. At the same time, the cam grooves 20 guide the cam rollers 21 so that the longitudinal axis of the actuating element 8' will reach a position of intersecting the pivot 12' of control lever 11. The coaction between the cam slots 20 and the guide rollers 21 is thus such that the transmission ratio of the operating lever varies quickly within a very small pivoting path of the operating lever 1'.

When the longitudinal axis of the actuating element 8' intersects control lever pivot 12' the distance between the longitudinal axis and the operating lever pivot 2' is at a minimum and remains at this minimum so that the maximum transmission ratio or lever advantage exists. This distance remains constant during subsequent pivoting of the operating lever 1'. This occurs because the control lever 11' is maintained in its most effective position. When the maximum transmission ratio is effective the guiding forces acting on the rollers 21 are extremely small and as a result good mechanical efficiency is secured. In addition, the bilateral guiding of the rollers on the control lever 11' eliminates the necessity of mounting the control lever on the operating lever.

Because of the combined effect of rapidly accelerating the actuating member toward the pivot 2' and maintaining the actuating member at an approximately constant distance therefrom it is not necessary that these components be manufactured with such great precision so that the costs of manufacturing are subsequently reduced.

Thus it can be seen that the present invention has disclosed a variable ratio operating lever which is relatively simple in construction but which attains a high mechanical efficiency since the applied actuating forces are large with respect to the distance through which the operating lever must be pivoted. Further, any slack or play in a brake linkage system is quickly overcome by a relatively small initial movement of the operating lever from its release position.

It is understood that this invention is susceptible to modification in order to adapt it to different usages and conditions and, accordingly, it is desired to comprehend such modifications within the invention as may fall within the scope of the appended claims.

What is claimed is:

1. In a variable ratio operating lever particularly adapted for a brake linage system, the combination of a pivotally mounted operating lever movable between release and braking positions, a control lever pivotally mounted on said operating lever, an actuating element connected to said control lever, means responsive to the initial movement of the operating lever from its release position for accelerating the movement of the longitudinal axis of said actuating element toward the pivot mount of said operating lever, the actuating element longitudinal axis at least intersecting the control lever pivot mount and the control lever remaining in a position during further movement of the operating lever from its release position at which control lever position the distance between said longitudinal axis and said operating lever pivot is a minimum.

2. In an operating lever as claimed in claim 1 wherein said responsive means comprises stop means abutted by said control lever when the operating lever is in the release position, said control lever being pivoted by said stop means when the operating lever is moved from its release position to decrease the distance between the longitudinal axis of said actuating element and said operating lever pivot.

3. In an operating lever as claimed in claim 1 wherein said responsive means comprises means for guiding bilaterally said control lever at least when the operating lever is near its release position.

4. In an operating lever as claimed in claim 3 wherein said guide means comprises a notch slideably receiving one end of said control lever to guide the pivotal movement of said control lever when the operating lever is near its release position.

5. In an operating lever as claimed in claim 1 wherein said control lever is pivotally mounted at one end thereof.

6. In an operating lever as claimed in claim 5 wherein said responsive means comprises a guide roller on said control lever at the connection thereof with said actuating element, and means for defining a cam guide for said guide roller.

7. In an operating lever as claimed in claim 6 wherein said cam guide extends toward the operating lever pivot to move quickly the guide roller toward the operating lever pivot to decrease the distance therebetween to a minimum when the operating lever is moved from its release position, the cam guide then gradually extending away from said operating lever pivot as the longitudinal axis of the actuating element intersects the control lever pivot so that said longitudinal axis remains in the position of intersecting said control lever pivot as the operating lever is moved further from its release position.

* * * * *